United States Patent [19]

Deane

[11] Patent Number: 4,817,909
[45] Date of Patent: Apr. 4, 1989

[54] ELASTOMERIC HANGER STRUCTURE

[75] Inventor: Donald L. Deane, Logansport, Ind.

[73] Assignee: GenCorp Inc., Akron, Ohio

[21] Appl. No.: 129,791

[22] Filed: Dec. 7, 1987

[51] Int. Cl.⁴ .......................................... F16M 13/00
[52] U.S. Cl. ..................................... 248/610; 248/60;
267/30; 267/51; 267/152; 267/100
[58] Field of Search ............... 267/30, 33, 51, 152,
267/160, 293; 248/60, 61, 610; 180/75.2, 296,
309; 104/115

[56] References Cited

U.S. PATENT DOCUMENTS

| 1,735,899 | 11/1929 | Henry | 267/30 |
| 3,323,763 | 6/1967 | Butts | 267/153 X |
| 3,722,225 | 3/1973 | Empson | 248/60 X |
| 4,660,797 | 4/1987 | Tonnies | 248/60 X |

FOREIGN PATENT DOCUMENTS

| 2658358 | 6/1978 | Fed. Rep. of Germany | 180/296 |
| 1434349 | 2/1966 | France | 267/152 |
| 134328 | 8/1982 | Japan | 180/312 |
| 119 | of 1889 | United Kingdom | 267/33 |
| 494811 | 11/1938 | United Kingdom | 267/141.2 |
| 2071265 | 9/1981 | United Kingdom | 267/141.5 |

Primary Examiner—George E. A. Halvosa

[57] ABSTRACT

An elastomeric hanger structure is designed to provide both force stabilization and vibration isolation while connecting a part such as a vehicle exhaust system with a supporting structure such as a vehicle chassis. The elastomeric hanger of the invention is also capable of being selectively tailored to control numerous static and dynamic conditions which may be encountered when the part is suspended.

5 Claims, 3 Drawing Sheets

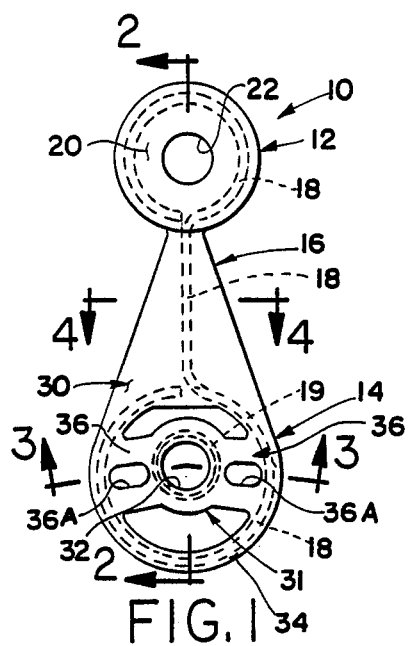
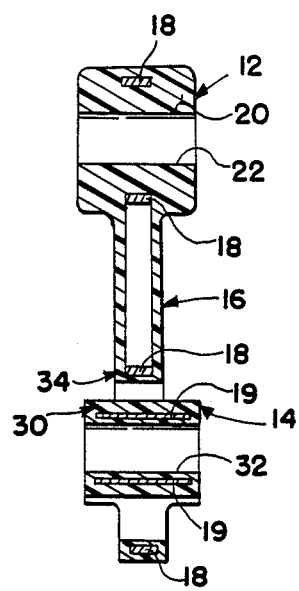
FIG. 1
FIG. 2
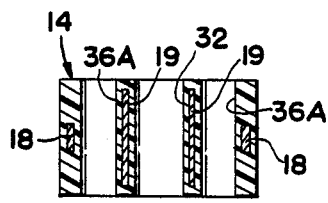
FIG. 3
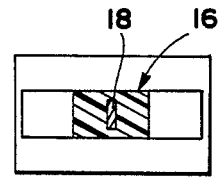
FIG. 4

ELASTOMERIC HANGER STRUCTURE

FIELD OF THE INVENTION

The present invention relates to an elastomeric hanger structure for use in connecting a part (e.g., a portion of vehicle exhaust system) with a supporting strucutre (e.g. a vehicle chassis). More specifically, the present invention relates to a new and useful elastomeric hanger structure designed to stabilize a part of an exhaust system to provide vibration isolation of the part and of the chassis, and to provide a fail-safe structure which can prevent the vehicle exhaust system from dropping onto the vehicle suspension or the ground in the event of failure of the elastomer.

BACKGROUND ART

Heretofore, vehicle exhaust systems have typically been hung from the underside of the vehicle's chassis by means of supporting brackets. Such brackets have generally been merely pieces of metal or rubber designed to connect the exhaust system to the vehicle without regard to force stabilization, vibration isolation, and the like.

SUMMARY OF THE INVENTION

The present invention relates to a new and useful elastomeric hanger structure specifically designed to provide both force stabilization and vibration isolation while connecting a part such as a vehicle exhaust system with a supporting structure such as a vehicle chassis. The hanger of the invention is also capable of being selectively tailored to control numerous static and dynamic conditions which may be encountered by the part during suspension thereof.

One important aspect of the hanger of the present invention is the manner in which the elastomeric design or configuration of the hanger provides vibration isolation and enables the hanger to be specifically configured or shaped for controlling numerous selected static and dynamic conditions. Specifically, the elastomeric hanger of the preferred embodiment has a pair of elastomeric coupling portions and an intermediate elastomeric portion connecting the pair of coupling portions. Each elastomeric coupling portion is designed to engage an attachment such as a bolt for connecting the elastomeric coupling portion to either a part or a support for the part. At least one of the elastomeric coupling portions comprises an inner section and is generally spaced therefrom. A web means connects selected portions of the inner and outer sections. The web means is designed to deflect under the application of predetermined forces to the hanger, thereby enabling the inner section to move relative to the outer section in response to forces which cause the web means to deflect. The web means can be designed with predetermined deflection characteristics by controlling features such as the thickness of the material, the composition of the elastomeric material, the hardness (durometer) of the elastomeric material, and the like.

Another important aspect of the hanger of the present invention is the provision of a special metal reinforcing means. The metal reinforcing means is preferably embedded in the elastomeric material and is covered by the elastomeric material so that it is protected against corrosion by the elastomeric material. The metal preferably circumscribes each of the elastomeric coupling portions in the elastomer, and extends through the intermediate elastomeric portion of the hanger. Thus, the metal provides a fail-safe backup against failure of the elastomeric material, and such a feature is especially useful in minimizing the likelihood of a vehicle exhaust system from falling onto the vehicle suspension or onto the ground in the event of failure of the elastomer. Additionally, the orientation of the metal reinforcement, and the orientation of the elastomeric coupling portions of the hanger are specially designed so that the metal also provides a certain degree of lateral stability to the elastomeric hanger structure.

These and other aspects of the present invention will become apparent from the following detailed description and the accompanying drawings.

BRIEF DESCRIPTION OF THE DRAWINGS

FIG. 1 is a side view of one type of elastomeric hanger constructed according to the principles of this invention;

FIG. 2 is a sectional view of the hanger of FIG. 2, taken on the line 2—2;

FIG. 3 is a sectional view of the hanger of FIG. 1, taken on the line 3—3;

FIG. 4 is a sectional view of the hanger of FIG. 1 taken on the line 4—4;

DETAILED DESCRIPTION OF THE INVENTION

Figure 11:
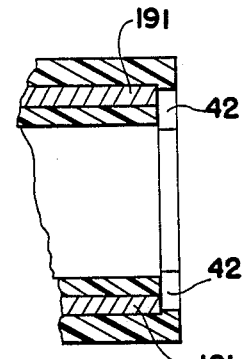
FIG. 11 is an enlarged sectional view of FIG. 10, taken on the line 11—11.
Figure 12:
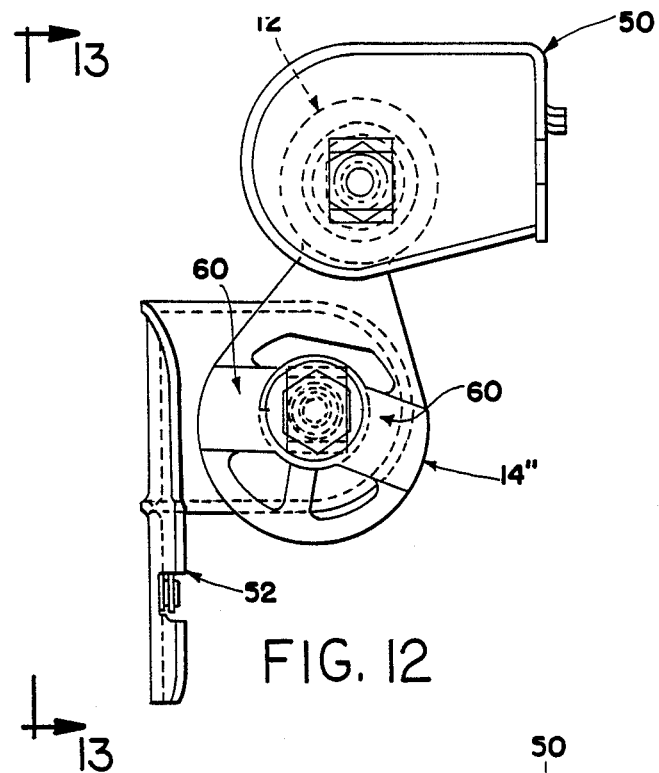
FIG. 12 is a schematic illustration of still another hanger according to the invention, shown connecting a pair of bracket parts.
Figure 13:
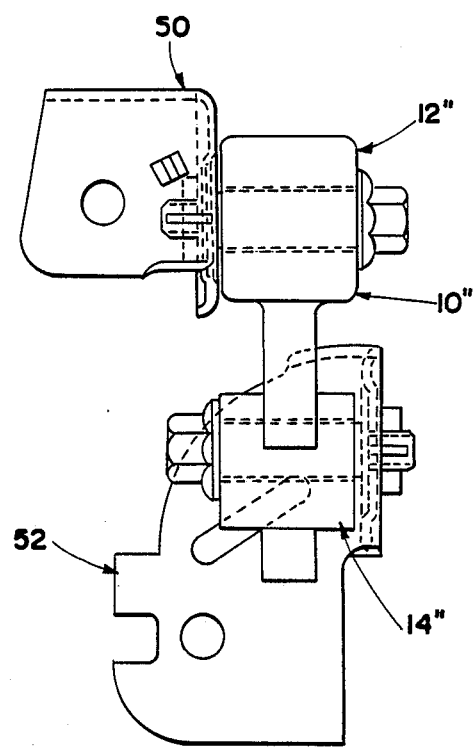
FIG. 13 is a side view of the structure of FIG. 12, taken on the line 13—13.

The present invention relates to an elastomeric hanger structure for connecting a part such as a vehicle exhaust system with a supporting structure such as the chassis of a vehicle. FIGS. 1 through 4 and 5 through 11 show two different forms of elastomeric hanger structures constructed according to the concepts of the present invention, and FIGS. 12 and 13 show another form of a hanger structure according to the present invention connecting two bracket members.

In FIGS. 1 through 4, hanger structure 10 basically comprises a first elastomeric coupling portion 12, a second elastomeric coupling portion 14 and an intermediate elastomeric connection portion 16 connecting the first and second elastomeric coupling portions 12 and 14. A length of corrosion resistant steel wire 18 and a ring of the steel wire 19 are embedded in the elastomeric material in a manner and for purposes discussed more fully hereinafter.

In the hanger of FIGS. 1 through 4, the first elastomeric coupling portion 12 comprises a body 20 of elastomeric material having central opening 22. The opening 22 is designed to receive an attachment means such as a connecting bolt for coupling the first portion 12 of the hanger with a bracket of either a vehicle chassis or a part of the vehicle's exhaust system. The second portion 14 comprises a body 30 of elastomeric material configured to define (i) an inner portion 31 with a central opening 32 (ii) an outer portion 34 surrounding the inner portion 31, (iii) a pair of webs 36 extending between the inner and outer portions 31 and 34, and (iv) a pair of openings 36A formed within the webs 36. The central opening 32 is designed to receive an attachment means such as a connecting bolt for coupling the second portion 14 of the hanger with the bracket associated with the vehicle chassis or part of the vehicle's exhaust system. The configuration of the web 36 and the openings 36A formed in the webs is designed to provide the hanger structure with predetermined deflection characteristics to enable the hanger to absorb forces and vibrations and to stabilize and/or isolate such forces or vibrations from being transmitted between the exhaust system and the vehicle chassis. The specific deflection characteristics of the hanger can be modified by altering the specific shape or form of the web 36, the openings 36A, the thickness of the elastomer, the composition of the elastomer, and the like.

The modification of the elastomeric hanger to provide for different static and dynamic conditions such as force stabilization and vibration isolation can be made in accordance with existing scientific and mechanical principles known to the art and to the literature, as for example set forth in *THEORY AND PRACTICE OF ENGINEERING WITH RUBBER* by Freakley and Payne, Applied Science Publishers LTD, London, England, 1978, and *ELASTOMERS: CRITERIA FOR ENGINEERING DESIGN* by Hepburn and Reynolds, Applied Science Publishers LTD, London, England, 1979, both of which are hereby fully incorporated by reference. For example, should the elastomer hanger of FIGS. 1 through 4 be required to carry a load about twice as heavy as the designed load, it can be redesigned to compensate for the additional weight by increasing the thickness of the hanger as for example in intermediate connecting portion 16, by increasing the thickness, i.e., width or depth, of steel wire 18, by changing the hardness (durometer) or composition of the rubber, by changing the configuration of the web and/or its support angle, or combinations of the above. For pragmatic reasons, such as making as few a number of dies as possible, the easiest solution is to increase the hardness or durometer of the rubber. Increasing the hardness of the rubber is conventional and is well known to the art and to the literature. Hence, force stabilization and/or vibration isolation can be readily controlled by increasing the durometer hardness of the rubber. The Shore A durometer hardness of the rubber can vary widely, as from about 40 to about 75, and preferably from about 50 to about 65.

According to an aspect of the present invention, the steel wire 18 and the steel ring 19 are embedded in the elastomeric hanger. As seen in FIGS. 1-4, the steel wire 18 is a single length of wire embedded in the elastomer so that the wire surrounds the central opening 22 in the first elastomeric coupling portion 12, that the wire extends through the intermediate elastomeric connecting portion 16, and that the wire extends into the outer portion 34 and circumscribes the central opening 32 in the inner portion 31 of the second elastomeric coupling portion 14. The metal ring 19 is provided in the inner portion 31, and also surrounds the central opening 32.

Wires 18 and 19 are embedded in the elastomer in such a manner that the metal wires are coated, covered, etc. by the elastomer from corrosive materials during normal operation of the hanger. Thus, the wires serve to reinforce the elastomer and in a manner that minimizes the likelihood of corrosion of the wires.

Steel wire 18 also provides a fail-safe mechanism for ensuring that the exhaust system does not drop onto the vehicle suspension or onto the ground in the event of failure of the elastomeric material. Specifically, since the wire completely surrounds both of the central openings 22 and 32 formed in the elastomeric coupling portions, it can engage the connecting bolts associated with the elastomeric coupling portions and thus retain the exhaust system attached to the chassis in the event of failure of the elastomer.

An important aspect of the metal wire of the present invention is that it not only provides a connection with good vibration isolation and/or force stability between the exhaust system and the chassis, but it also provides a connection with good lateral stability. Specifically, the central openings 22 and 32 in the elastomeric hanger extend parallel to each other, and the elastomeric web parts 36, 36A enable the hanger to deflect in order to take up strains which act parallel to the axis of openings 22 and 32. The steel wire 18 is disposed to allow the web to deflect, but minimizes the tendency of the hanger to move in the direction of the axes of central openings 22 and 32. Another important aspect is that the cantilevered portion of the metal wire which is located in intermediate elastomeric portion 16, also serves to dampen or abate lateral forces applied to the metal hanger. Hence, the metal wire as well as web means 36A provide lateral stability.

FIGS. 5 through 11 disclose another embodiment of the elastomeric hanger constructed according to the concepts of the present invention. The hanger of FIGS. 5 through 11 differs from the hanger of FIGS. 1 through 4 primarily in that (i) the profile of its web portions 36' are different (they lack openings); (ii) the profile of its intermediate connecting portion 16'; and (iii) the shape of its metal wire 18'. However, the metal wire still extends into and through the elastomer, and is shielded by the elastomer during normal operation. Additionally, the metal is disposed in such a way that it provides a fail-safe reinforcement for the elastomer in the event of failure of the elastomer.

Figure 5:
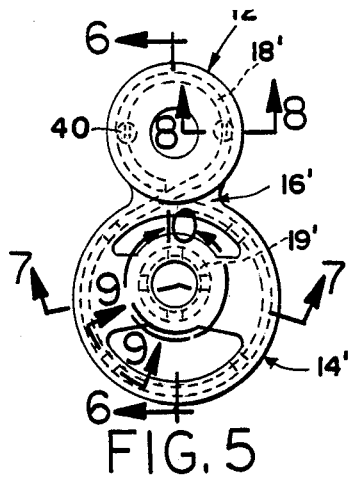
FIG. 5 is a side view of another type of elastomeric hanger constructed according to the principles of this invention.
Figure 6:
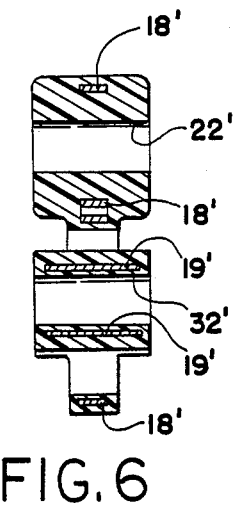
FIG. 6 is a sectional view of the hanger of FIG. 5, taken on the line 6—6.
Figure 7:
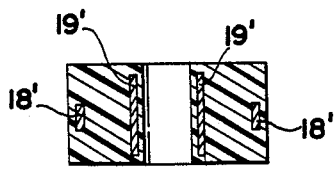
FIG. 7 is a sectional view of the hanger of FIG. 5, taken on the line 7—7.
Figure 8:
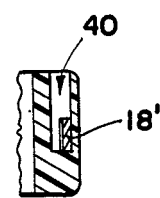
FIG. 8 is an enlarged sectional view of FIG. 5, taken on the line 8—8.
Figure 9:
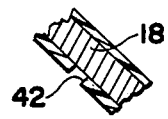
FIG. 9 is an enlarged sectional view of the hanger of FIG. 5, taken on the line 9—9.
Figure 10:
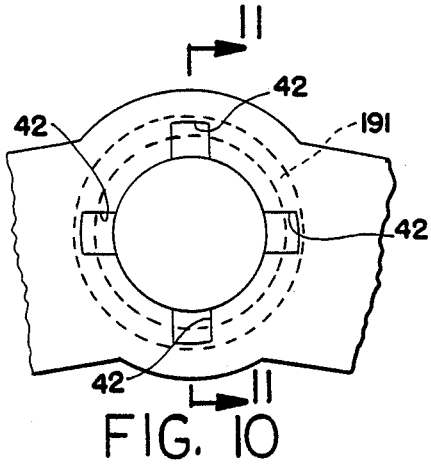
FIG. 10 is an enlarged view of the area of the hanger of FIG. 5, labeled 10—10.

The elastomeric hanger of the invention is preferably a molded part. As shown in FIGS. 5, 8 and 11, the elastomeric portions of the hanger of FIGS. 5 through 11 has locator holes 40 (FIGS. 5, 8) and 42 (FIGS. 5, 9, 10, 11). Those locator holes are associated with the metal wires. They result from the inclusion of locator pins in the mold, which enables the metal wires to be molded into the elastomer.

In FIGS. 12 and 13, still another hanger according to the invention is shown connecting a first bracket 50 to a second bracket 52. The bracket 52 could be connected with a vehicle exhaust system, and the bracket 50 could be connected with a vehicle chassis. The elastomeric hanger is reinforced with a metal wire (not shown) and has a profile designed to allow a predetermined deflection of its web 60 in order to isolate vibrations and to provide a good lateral stability to the exhaust system.

The embodiments of FIGS. 5 through 11 and 12 and 13 can also be altered in a manner as set forth above with regard to the embodiment of FIGS. 1 through 4, so that the elastomeric hanger can be tailor-made to handle various static and dynamic conditions such as deflection, vibration, force stabilization, and the like. As noted above, this can be accomplished by increasing or decreasing the thicknesses of the various elastomer portions, by increasing or decreasing the thickness of the metal insert 19, by changing the configuration of the web, or preferably by increasing or decreasing the durometer hardness of the rubber.

While in accordance with the patent statutes, the best mode and preferred embodiment has been set forth, the scope of the invention is not limited thereto, but rather by the scope of the attached claims.

What is claimed is:

1. An elastomeric hanger for suspending a part of an exhaust system from a motorized vehicle chassis, said hanger comprising a unitary molded elastomer having a Shore A durometer hardness of from about 40 to about 75 whereby the strength of the elastomer is sufficient to support said exhaust system for further comprising:
   a first elastomeric coupling portion having an opening for receiving an attachment means which connects the first coupling portion with the part, the opening having a central axis;
   a second elastomeric coupling portion having (i) a first section having an opening formed about a central axis which is substantially parallel to the central axis formed in the first elastomeric coupling portion, (ii) a second section radially outward and circumscribing said first section and being spaced therefrom, and (iii) web means connecting selected portions of said first and second sections; said web means being designed to deflect under the application of predetermined lateral forces to said hanger, said lateral forces being substantially parallel to the central axis of the openings formed in the first and second elastomeric coupling portions so that said first section can move along said central axis relative to said second section in response to forces which cause said web means to deflect so as to inhibit the transmission of forces between the part and the support and to isolate vibration of the part;
   an intermediate elastomeric portion connecting said first and second elastomeric coupling portions; and
   metal reinforcing means comprising a length of metal wire embedded in said first coupling portion, in said intermediate portion and in the second section of the second coupling portion, said wire at least partially enclosing each of the openings in the first and the second elastomeric coupling portions.

2. An elastomeric hanger according to claim 1, wherein said metal reinforcing means comprises a single length of wire.

3. An elastomeric hanger according to claim 1, wherein said wire circumscribes each of the openings in said first and said second coupling portion.

4. An elastomeric hanger for suspending a part of an exhaust system from a motorized vehicle chassis, said hanger comprising a unitary molded elastomer having a Shore A durometer hardness of from about 40 to about 75 and further comprising:
   a first elastomeric coupling portion having an opening for receiving an attachment means which connects the first coupling portion with the part, the opening having a central axis;
   a second elastomeric coupling portion having (i) a first section having an opening formed about a central axis which is substantially parallel to the central axis formed in the first elastomeric coupling portion, (ii) a second section radially outward and circumscribing said first section and being spaced therefrom, and (iii) web means connecting selected portions of said first and second sections; said web means being designed to deflect under the application of predetermined lateral forces to said hanger, said lateral forces being substantially parallel to the central axis of the openings formed in the first and second elastomeric coupling portions so that said first section can move along said central axis relative to said second section in response to forces which cause said web means to deflect so as to inhibit the transmission of forces between the part and the support and to isolate vibration of the part;
   an intermediate elastomeric portion connecting said first and second elastomeric coupling portions; and
   metal reinforcing means comprising a length of metal wire embedded in said first coupling portion, in said intermediate portion and in the second section of the second coupling portion, said wire at least partially enclosing each of the openings in the first and the second elastomeric coupling portions whereby said metal reinforcing means comprises a fail safe structure in the event of failure of the elastomer.

5. An elastomeric hanger according to claim 4, wherein said metal reinforcing means comprises a single length of wire.

* * * * *